No. 661,869. Patented Nov. 13, 1900.
P. HENKENIUS.
FISHING BAIT.
(Application filed July 28, 1900.)
(No Model.)
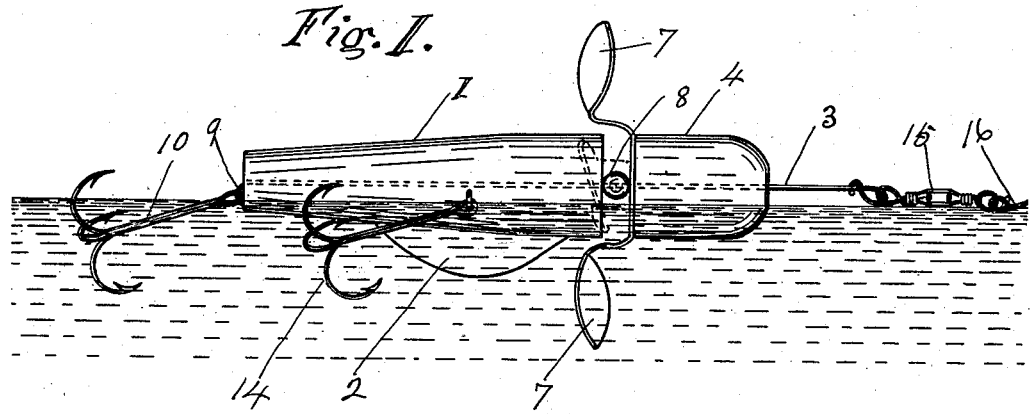
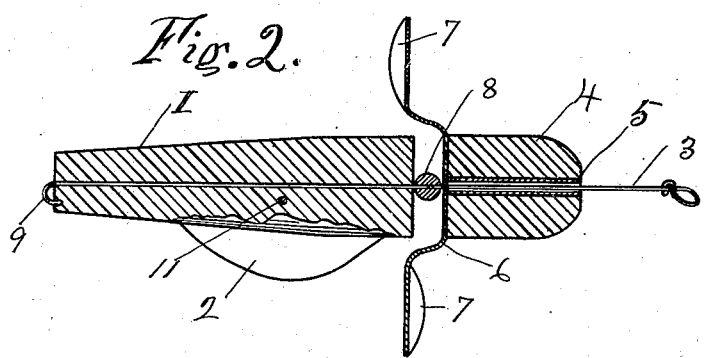
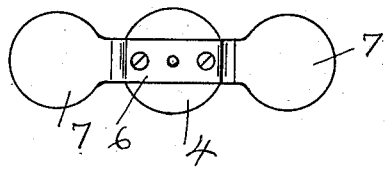
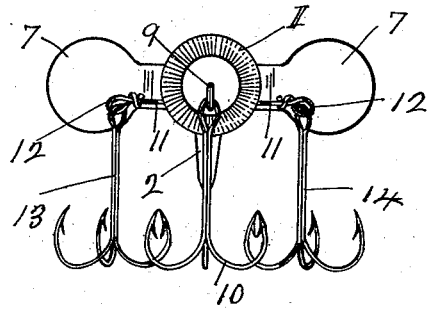
WITNESSES: Peter Henkenius INVENTOR
Adelaide Kearns.
Augusta Liberg. BY Chapin & Denny
His ATTORNEYS.

United States Patent Office.

PETER HENKENIUS, OF FORT WAYNE, INDIANA, ASSIGNOR OF ONE-HALF TO JAMES M. KANE, OF SAME PLACE.

FISHING-BAIT.

SPECIFICATION forming part of Letters Patent No. 661,869, dated November 13, 1900.

Application filed July 28, 1900. Serial No. 25,079. (No model.)

*To all whom it may concern:*

Be it known that I, PETER HENKENIUS, a citizen of the United States, residing at Fort Wayne, in the county of Allen, in the State of Indiana, have invented certain new and useful Improvements in Fishing Apparatus; and I do hereby declare that the following is a full, clear, and exact description of the invention, which will enable others skilled in the art to which it appertains to make and use the same, reference being had to the accompanying drawings, which form part of this specification.

My invention relates to improvements in fishing apparatus especially adapted for use in trolling.

The object of my improvement is to provide a cheap, simple, and efficient fishing apparatus for trolling, adapted to float upon the surface instead of some distance below the surface, and having a bait consisting of a propeller-like twirler, which revolves rapidly when the apparatus is drawn through the water by the trolling-line independently of the non-rotatable body of the apparatus which carries the hooks and which is provided with a metallic rudder, which serves to ballast the device and prevent its displacement in use.

My invention consists of a floating body portion, preferably cylindrical and made of wood to give it buoyancy, to which a plurality of hooks are pivotally secured, and provided upon its lower face with a pendent fixed rudder adapted to securely keep the said body in its normal position and prevent any rotation thereof in use, and a bait consisting of a revoluble cylindrical twirler mounted on a fixed rod adjacent to the forward end of said body and provided upon its rear end with a pair of propeller-blades adapted to receive the impact of the water when in use.

The principal novel feature of my invention resides in the construction whereby the apparatus is made to float upon the surface of the water and the body portion is non-rotatable in use.

In the accompanying drawings, Figure 1 is a side view of my improvement in position for use, showing the relative arrangement of its operative parts in the water and connected to a trolling-line. Fig. 2 is a vertical longitudinal section of the device, excepting a small portion adjacent to the rudder. Fig. 3 is a view of the inner end of the baiting-twirler, showing the manner of securing the propeller-blades in position thereon. Fig. 4 is a rear end view of my device, showing the relative arrangement of the hooks.

Referring now to the drawings, the body portion, about two and one-half inches in length, preferably cylindrical and somewhat conical in form, is made of wood or other material possessing sufficient buoyancy to enable it to float upon the surface of the water in use and is provided upon its lower face with a longitudinally-arranged fixed pendent rudder 2, adapted to ballast the floating body 1. This rudder 2 is of metal and of sufficient relative weight to prevent any rotation of said body 1 under all conditions of service. A non-corrosive metallic rod 3 is rigidly fixed in a longitudinal central perforation in said body 1. The rear extremity of said rod is preferably rigidly secured in the adjacent end of said body, as shown. On the forward extended end of the rod 3 is revolubly mounted the bait-twirler 4, also of wood or other buoyant or light material and having a longitudinal central perforation in which is fixed a non-corrosive metallic sleeve 5, through which the forward end of the rod 3 passes and in which it forms a loose bearing, Fig. 2. Upon the inner and rear end of the said twirler 4 is rigidly fixed by screws or in other proper manner the transverse plate 6, having its ends rearwardly bent, as shown, and provided with the fixed or integral propeller-blades 7, identical in form and function, but having their corresponding surfaces oppositely inclined to receive the impact of the water in a well-understood manner. This plate 6 is also apertured midway its ends to loosely receive the rod 3. On the said rod 3, immediately adjacent to the forward end of the said body portion, is arranged a fixed ball 8, of greater diameter than the opening in said plate or said sleeve and adapted to prevent all danger of contact of the said revoluble twirler or the plate 6 thereon with the said body 1. To the said body 1 are pivotally secured a plurality of hooks, preferably three in number, arranged as follows: The rear end of the rod 3 is so looped as to form an eye 9, Fig. 2, in which the rear hook 10 is mounted by passing the said loop through the usual eye on the shank of the hook.

At a proper point on the body 1, preferably near the middle of its length, is fixed a transverse rod or wire 11, which passes through a suitable transverse perforation in said body. This rod or wire 11 has its ends looped into eyes 12, in which the hooks 13 and 14 are mounted. Obviously the said rod 11 need not extend longitudinally through the said body 1, but instead thereof a suitable eye 9 may be secured in the outer or rear end of said body, and the ball 8, having a fixed rod 3, may be secured to the other end of said body without departing from the scope of my invention. These hooks 10, 13, and 14 may be of any proper form, though preferably provided with three barbs, as shown.

A proper swivel 15, Fig. 1, may be interposed in the usual manner between the forward end of the rod 3 and the line 16, if desired.

The operation of my improvement thus described is obvious and, briefly stated, is as follows: When my invention is drawn by the line 16 through the water, the body 1 and twirler 4 will float upon the surface and the pendent rudder 2 will keep the body 1 upright and steady in use, and thereby prevent entanglement of the line. The impact of the water alternately upon the said propeller-blades 7 will cause a rapid rotation of the said bait-twirler 4. The blades 7 and plates 6 are preferably of aluminium and present a bright attractive surface at which the fish readily bite, wherefore they are caught by one or more of the said hooks. As the said bait-twirler is securely separated from the said body 1 by the ball 8, there is no possibility of its contacting therewith, and thus interfering with its free and regular rotation. As my improvement floats upon the surface at all times when in use it can be seen at a greater distance and forms a better bait than when operated, as is usually done, below the surface.

Obviously the mere form of the body 1 or the bait-twirler may be varied at pleasure, as well as the number and relative arrangement of the hooks, without departing from the spirit of my invention, which consists, broadly, in a fishing apparatus adapted to float upon the surface, having a revoluble bait-twirler and provided with a pendent rudder adapted to prevent any rotation of the device, and thereby avoid the resulting entanglement of the line.

Having thus described my invention, what I desire to secure by Letters Patent is—

1. In a fishing apparatus a floating member fixed on a supporting-rod provided with one or more hooks and a pendent keel or rudder for the purpose specified; a revoluble bait-twirler mounted on said rod; and means for separating said members, thereby preventing derangement of the said twirler by contact with the said floating member.

2. The combination in a fishing apparatus of a floating member having suitable hooks and a pendent keel or rudder for the purpose described; a revoluble bait-twirler arranged in coöperative relation with said member and out of contact therewith; and means for separating said members to prevent derangement of the said twirler by contact with the said member.

3. In a fishing device the combination of the floating member 1 mounted on the rod 3, having a plurality of barbed hooks, and a pendent rudder 2; a revoluble bait-twirler 4 arranged as shown on said rod, and provided with propeller-blades 7; and means for separating said members and thereby preventing derangement of said twirler by contact with the said member 1, all substantially as described.

Signed by me at Fort Wayne, Allen county, State of Indiana, this 25th day of July, A. D. 1900.

PETER HENKENIUS.

Witnesses:
ADELAIDE KEARNS,
AUGUSTA VIBERG.